US 7,468,205 B2

(12) United States Patent
Schwertfeger et al.

(10) Patent No.: US 7,468,205 B2
(45) Date of Patent: *Dec. 23, 2008

(54) MULTILAYER COMPOSITE MATERIALS WITH AT LEAST ONE AEROGEL-CONTAINING LAYER AND AT LEAST ONE OTHER LAYER, PROCESS FOR PRODUCING THE SAME AND THEIR USE

(75) Inventors: Fritz Schwertfeger, Frankfurt (DE); Marc Schmidt, Frankfurt (DE); Dierk Frank, Hofheim (DE)

(73) Assignee: Cabot Corporation, Boston, MA (US)

( * ) Notice: Subject to any disclaimer, the term of this patent is extended or adjusted under 35 U.S.C. 154(b) by 529 days.

This patent is subject to a terminal disclaimer.

(21) Appl. No.: 09/355,045

(22) PCT Filed: Jan. 22, 1998

(86) PCT No.: PCT/EP98/00329

§ 371 (c)(1),
(2), (4) Date: Sep. 23, 1999

(87) PCT Pub. No.: WO98/32709

PCT Pub. Date: Jul. 30, 1998

(65) Prior Publication Data

US 2002/0025427 A1     Feb. 28, 2002

(30) Foreign Application Priority Data

Jan. 24, 1997   (DE)   ................. 197 02 240

(51) Int. Cl.
  *B32B 5/16*    (2006.01)
  *B32B 9/04*    (2006.01)
  *B32B 27/38*   (2006.01)
  *B32B 27/06*   (2006.01)
  *B32B 27/00*   (2006.01)

(52) U.S. Cl. ........................ 428/323; 428/220; 428/331; 428/411.1; 428/413; 428/414; 428/473.5; 428/484; 428/500; 428/515; 428/904.4

(58) Field of Classification Search ................ 428/220, 428/304.4, 318.4, 319.3, 319.7, 319.9, 323, 428/331, 332, 339, 411.1, 412–414, 423.1, 428/446–449, 452, 480, 474.4, 473.5, 542.8, 428/688, 923, 926, 484, 500, 515, 904.4
See application file for complete search history.

(56) References Cited

U.S. PATENT DOCUMENTS

| 4,447,345 | A |   | 5/1984  | Kummermehr |
|-----------|---|---|---------|-----------------------------|
| 5,656,195 | A | * | 8/1997  | Mielke et al. ........... 252/62 |
| 5,786,059 | A |   | 7/1998  | Frank et al. |
| 5,792,540 | A | * | 8/1998  | Hughes .................. 428/76 |
| 5,948,314 | A | * | 9/1999  | Geiss et al. ............. 252/62 |
| 6,080,475 | A | * | 6/2000  | Frank et al. ............. 428/331 |
| 6,143,400 | A | * | 11/2000 | Schwertfeger et al. ... 428/304.4 |
| 6,485,805 | B1| * | 11/2002 | Smith et al. ............. 428/36.5 |
| 6,887,563 | B2| * | 5/2005  | Frank et al. ............. 428/312.6 |

FOREIGN PATENT DOCUMENTS

| CA | 2214791   |   | 9/1996  |
|----|-----------|---|---------|
| DE | 195 07 732|   | 9/1996  |
| JP | 57-166391 |   | 10/1982 |
| WO | WO96/12683| * | 5/1996  |
| WO | WO96/15997| * | 5/1996  |
| WO | WO 96/15998|  | 5/1996  |
| WO | 96/19607  |   | 6/1996  |
| WO | 96/27726  |   | 9/1996  |
| WO | WO97/10187| * | 3/1997  |
| WO | WO 97/10187|  | 3/1997  |

* cited by examiner

Primary Examiner—Sheeba Ahmed

(57) ABSTRACT

Multilayer composite materials with at least one aerogel-containing layer and at least one other layer, a process for producing the same and their use are disclosed. The aerogel-containing layer(s) further contain at least one binder.

18 Claims, No Drawings

MULTILAYER COMPOSITE MATERIALS WITH AT LEAST ONE AEROGEL-CONTAINING LAYER AND AT LEAST ONE OTHER LAYER, PROCESS FOR PRODUCING THE SAME AND THEIR USE

DESCRIPTION

The invention relates to novel multilayer composite materials of any conformation, having very high heat-insulating and/or body and tread acoustic-insulating ability, processes for production thereof, and their use.

Conventional heat-insulating or body and tread acoustic-insulating materials based on polystyrenes, polyolefines and polyurethanes are produced using propellants such as for example FC hydrocarbons, $CO_2$ or pentane. The propellant enclosed in the cells of the foam is responsible for the high insulating ability. However, such propellants are a burden on the environment, since they slowly escape into the atmosphere.

Other body and tread acoustic insulators based on mineral or glass wool may emit fibers or fiber fragments in production, installation and removal, as well as during their period of service. This leads to a stress on the environment and the people who handle or are exposed to these materials.

Aerogels, especially those with porosities over 60% and densities below 0.6 $g/cm^3$, depending on process of production, are transparent, translucent or opaque and exhibit an extremely low thermal conductivity. They are therefore employed as heat insulation, as described for example in EP A 0,171,722.

Aerogels in the broad sense, i.e. in the sense of 'gel with air as dispersion agent,' are produced by drying a suitable gel. The term "aerogel" in this sense includes aerogels in the narrow sense, xerogels and cryogels. Thus a dried gel is referred to as an aerogel in the narrow sense if the liquid of the gel is very largely removed at temperatures above the critical temperature and starting out from pressures above the critical pressure. But if the liquid of the gel is removed subcritically, for example with formation of a liquid-vapor boundary phase, then the resulting gel may often be referred to as a xerogel.

When the term aerogels is used in the present application, it refers to aerogels in the broader sense, i.e. in the sense of 'gel with air as dispersion agent.'

Various processes for producing aerogels by super- or sub-critical drying are disclosed for example in EP A 0,396,076, WO 92/03378, WO 94/25149, WO 92/20623 and EP A 0,658,513.

The aerogels obtained by supercritical drying are generally hydrophile or only briefly hydrophobe, whereas aerogels dried subcritically, by virtue of their production (generally silylation) are permanently hydrophobe.

Furthermore, aerogels may in principle be subdivided into inorganic and organic aerogels, inorganic aerogels having been known ever since 1931 (S. S. Kistler, *Nature* 1931, 127, 741), whereas organic aerogels from a wide variety of starting materials, e.g. melamine formaldehyde, have been known for only a few years (R. W. Pekala, *J. Mater. Sci.* 1989, 24, 3221).

Besides, composite materials containing aerogels may in principle be subdivided into opaque and transparent/translucent composite materials. They are used as heat insulators chiefly by reason of their low heat conductivity.

Opaque composite materials containing aerogels are disclosed for example in EP A 0,340,707, EP A 0,667,370, WO 96/12683, WO 96/15997 and WO 96/15998. These composite materials in some instances do contain transparent aerogel granulates, but the additional components are opaque rendering the systems opaque as a whole.

Transparent composite materials containing aerogels are described in German Patent Application P 196 34 109.4. Here aerogel particles are bonded together into moldings of any shape by means of transparent and/or translucent plastics as binder.

Again, a transparent aerogel composite is disclosed in DE A 4,430,642 and DE A 4,430,669. Such a composite material is present for example in the form of a mat containing the aerogels and fibers distributed therein, the aerogel fragments being held together by the fibers. While good results have been obtained with such transparent materials, disadvantages of cost remain, besides the need to produce the systems in one step.

A transparent component having at least two sheets of transparent material in parallel arrangement, with fiber-reinforced aerogel plates and mats in the space between, is disclosed for example in German Patent Application 195 07 732.6. By this measure, the stability of the system is much enhanced, but complicated structure and high cost remain.

An alternative to the composite materials containing aerogel is described in CA C 1,288,313, EP A 018,955 and DE A 4,106,192. According to these sources, aerogel monoliths are placed between sheets of glass to improve insulating effect through the low heat conductivity of the aerogel and/or to improve the acoustic attenuation of such sheets.

In this way, while nearly glass-clear, transparent sheets can be obtained, yet owing to the low mechanical stability of the aerogels, the outlay for production of suitably large monoliths is too high for such glass sheets to be used on a larger scale. Also, aerogel-filled "vacuum panel" systems are known, as disclosed for example in EP A 0,468,124, EP A 0,114,687 and DE A 3,347,619. The disadvantage of the "vacuum panel" systems, however, is that they cannot be altered in shape or size subsequently at the point of use.

The composite materials containing aerogel and known to the literature as described above do have a low heat conductivity, but the proportion of aerogel particles must be very high to achieve heat conductivities under 50 mW/mK. Hence such systems are very susceptible to mechanical load, greatly restricting their serviceability. Besides, owing to the high costs involved in the aerogel, they are very expensive. Furthermore, the surfaces of such composite materials and their properties are to a very large extent determined by the aerogel, since this is distributed more or less uniformly throughout the system. Hence these composite materials must often be clad for easy processing with other components in the field of application in question. However, this will usually entail additional steps in manufacture.

One object of the present invention, then, was to develop a heat-insulating composite material containing aerogels, simple to produce, in any shape and size, and not exhibiting the above mentioned disadvantages of the systems known in the prior art.

Besides, it was an object of the present invention to develop a composite material containing aerogels, having better heat insulation for like proportions of aerogel, i.e. lower heat conductivity, or a comparable heat insulation with a smaller proportion of aerogel than conventional composite systems.

Still another object of the present invention was to prepare a heat-insulating composite material containing aerogels and moreover having body and/or tread acoustic-insulating properties.

Within the scope of this specification, body sound is understood to mean sound propagated in solids. By tread sound is meant the sounds resulting for example from walking on a ceiling or moving chairs, and emitted partly as body sound and partly as air sound (company brochure, Rhinolith Dämmstoffe GmbH; specifications in 150 *Bauphysik* 6/96 and W. Reichgraf, *Grundlagen der technischen Akustik*, Akademische Verlagsgesellschaft, Leipzig 1968).

The objects described above are accomplished by a multilayer composite material comprising at least one layer containing aerogel and at least one other layer, the layer containing aerogel also containing at least one binder.

The multilayer composite material according to the invention thus comprises at least two, preferably at least three, layers.

Especially preferred is a composite material having three layers, and in particular a "sandwich" system, in which a layer containing aerogel is arranged between two other layers.

The proportion of aerogel particles in the at least one layer containing aerogel should generally lie in the range from 5 to 97 vol. %.

With an aerogel particle content significantly below 5 vol. % in the at least one layer containing aerogel, owing to the low content of aerogel particles in the composite material, its positive properties would be lost to a large extent. Such a composite material would fail to exhibit low densities and heat conductivities.

An aerogel particle content significantly above 97 vol. % would lead to a binder content of less then 3 vol. %. In that case, this proportion would be too low to ensure an adequate connection of the aerogel particles with each other, as well as mechanical compressive and bending strengths.

In the at least one layer containing aerogel, the proportion of aerogel particles preferably lies in the range from 40 to 95 vol. %, especially so in the range from 60 to 95 vol. %.

An especially high proportion of aerogel particles in the at least one aerogel-containing layer of the composite material may be achieved by using a bimodal distribution of grain sizes. Another possibility for achieving an especially high proportion of aerogel particles in the at least one aerogel-containing layer of the composite material is the use of aerogel particles exhibiting a logarithmic normal distribution of grain size.

In order moreover to achieve as high a fill factor as possible, it is advantageous also if the aerogel particles are small compared to the total thickness of the aerogel-containing layer.

The size of the aerogel particles in the at least one aerogel-containing layer of the composite material lies preferably in the range from 250 microns to 10 mm, especially so in the range from 250 microns to 5 mm, and most especially so in the range from 250 microns to 2 mm. The size of the aerogel particles here refers only to the mean diameter of the individual aerogel particle, while the aerogel particles, for reasons of production, for example by grinding, need not necessarily be of substantially spherical shape.

Aerogels generally used for the composite materials according to the invention are those based on metal oxides, suitable for the "sol-gel" technology (C. J. Brinker, G. W. Scherer, *Sol-Gel-Science* 1990, ch. 2 and 3), such as for example Si or Al compounds, or those based on organic substances suitable for these "sol-gel" technology, such as for example melamine formaldehyde condensates (U.S. Pat. No. 5,086,085) or resorcinol formaldehyde condensates (U.S. Pat. No. 4,873,218). The compound materials may alternatively be based on mixtures of the materials mentioned above. Preferably, use is made of aerogels containing Si compounds, and particularly $SiO_2$ aerogels.

To reduce the radiation component of the heat conductivity, the aerogel may contain IR turbidity agents, such as for example carbon black, titanium dioxide, iron oxides or zirconium dioxide and mixtures thereof.

In a preferred embodiment, the aerogel particles permanently comprise hydrophobe surface groups. Examples of suitable groups for lasting hydrophobization are silyl groups of general formula —$Si(R)_n$, where n=1, 2 or 3, preferably trisubstituted silyl groups in which the radicals are, in general independently of each other alike or different, each R a hydrogen atom or a non-reactive organic linear, branched, cyclic, aromatic or heteroaromatic radical, preferably $C_1$-$C_{18}$ alkyl or $C_6$-$C_{14}$ aryl, especially so $C_1$-$C_6$ alkyl, cyclohexyl or phenyl, in particular methyl or ethyl. Especially advantageous for lasting hydrophobization of the aerogel is the use of trimethylsilyl groups. The introduction of these groups may be accomplished for example as described in WO 94/25149 or German Patent Application P 196 48 793.6, or by gaseous phase reaction between the aerogel and for example an activated trialkylsilane derivative such as for example a chlorotrialkylsilane or a hexalkyldisilazane (cf. R?ller, *The Chemistry of Silica*, Wiley & Sons 1979). Compared to OH groups, the hydrophobe surface groups thus produced also diminish the dielectric loss factor and the dielectric constant.

Aerogel particles with hydrophile surfaces, depending on atmospheric humidity, can adsorb water, with the result that the dielectric constant and the dielectric loss factor may vary with the relative humidity. This is often undesirable for electronic applications. The use of aerogel particles with hydrophobe surface groups prevents such variation, since no water is adsorbed. The selection of the radicals will also depend on the typical service temperature.

If aerogel particles with hydrophobe surfaces are used in combination with hydrophobe binders, a hydrophobe composite material is obtained.

Furthermore, the thermal conductivity of the aerogels decreases with increasing porosity and decreasing density. Preference is therefore given to aerogels having porosities over 60% and densities below 0.6 $g/cm^3$. Especially preferred are aerogels with densities below 0.2 $g/cm^3$, and most especially, aerogels with densities between 0.16 and 0.10 $g/cm^3$.

The binder in the at least one aerogel-containing layer forms a matrix that connects or encloses the aerogel particles and extends as a continuous phase through the at least one aerogel-containing layer, and if desired through the entire composite material as well.

In principle, all known binders are suitable for production of the composite materials according to the invention. Binders with low heat conductivity, however, are preferred. Here it is not decisive whether the binder is present in amorphous, semicrystalline and/or crystalline form. The binder is employed either in liquid form, i.e. as liquid, melt, solution, dispersion or suspension, or else as powdered solid.

Binders in the sense of the present invention may be either physically setting or chemically setting single-component adhesives as well as chemically setting two- or multicomponent adhesives. As examples of such binders, mention may here be made of fusion adhesives, dispersion adhesives, solvent adhesives, plastisols, thermosetting epoxide resins, reactive fusion adhesives such as ethylene vinyl acetate copolymers and polyamides, formaldehyde condensates, polyimides, polybenzimidazoles, cyanacrylates, polyvinyl alcohols, polyvinyl butyrals, polyethylene waxes, anaerobic adhesives, moisture-setting silicones and photo- and UV-setting systems, methacrylates, two-component silicones, cold-setting epoxide resins and cold-setting polyurethanes.

Further, binders in the sense of the present invention may for example also be transparent or translucent synthetics such as polymethylmethacrylates (PMMA, e.g. Degalan®, Plexiglass®), cycloolefin copolymers (COC, e.g. Topas®), polyvinylbutyrals (e.g. Mowital®), polycarbonates and polyethyleneterephthalates (PET, e.g. Hastaglas®) polyvinylbutyrals, polyvinyl alcohols and polymethyl-methacrylates being preferred.

Further, binders in the sense of the present invention may also be fibrous in nature, as for example bicomponent fibers.

Also, the binders may be present in foamed form.

The binder in the at least one aerogel-containing layer is generally employed in a quantity from 3 to 95 vol. % of the composite material, preferably in a quantity from 3 to 60 vol. %, more preferably in a quantity from 3 to 40 vol. %, and most preferably in a quantity from 3 to 20 vol. %. The choice of binder depends on the desired mechanical and thermal properties of the composite material. Besides, preferably such binders are selected as present a low heat conductivity.

In the selection of the binders, preferably also such products are selected as substantially do not penetrate into the interior of the porous aerogel particles. Penetration of the binder into the interior of the aerogel particles may affect not only the choice of binder but also, by way of temperature regulation, the processing time.

Additionally, the at least one aerogel-containing layer of the composite material may also contain up to 50 vol. % filler, as for example wood meal, asbestos and preferably cellulose, for example to improve its mechanical properties. Preferably the proportion of fillers is in the range from 0 to 20 vol. %.

Further, the at least one aerogel-containing layer of the composite material may also contain at least one fiber material. The addition of fibers is advantageous in particular for thermal applications and in view of crack formations and ultimate strength. Preferred fibers here are the materials known to those skilled in the art for such purposes and those described in German Patent Application 195 33 564.3. The properties, peculiarities and proportions in combination with aerogels are described in the same patent application.

As compared to a material containing only aerogel particles connected by way of their surfaces by a binder or incorporated in a binder matrix, surprisingly even small volume proportions of fibers for like volume proportions of binders lead to a substantial mechanical reinforcement, since they assume substantial parts of the load. If a higher volume proportion of fibers is used, and but little binder, a porous material may be obtained in which the fibers connected by the at least one binder form a mechanically stable scaffolding in which the aerogel particles are lodged. The air pores there appearing lead to a higher porosity and hence improve acoustic insulation.

By the at least one binder, either the fibers and aerogels are connected among and with each other or else the at least one binder serves as matrix material in which the fibers and the aerogel particles are imbedded.

Further, in the at least one aerogel-containing layer of the composite material, lubricants may also be present in small amounts, as for example zinc stearate, pigments as for example titanium dioxide, plasticizers such as for example glycerine and o,p-toluenesulfonamide and/or acid or acid-yielding setting accelerators.

Besides, also so-called "coupling agents" may be employed. They effect a better contact of the binder with the surface of the aerogel particles and may moreover enter into a firm bond both with the aerogel particles and with the binder.

The at least one additional layer of the composite material comprises either no aerogel or definitely less aerogel than the at least one aerogel-containing layer. The proportion of aerogel particles is preferably in the range from 0 to 40 vol. %. If the at least one other layer contains aerogel particles, it/they are preferably of a construction like that of the at least one aerogel-containing layer, but with correspondingly altered proportions with respect to aerogel particles and binder. Here each layer may be composed of other materials or exhibit other proportions.

In general, materials are preferred that afford a good and mechanically stable combination with the at least one aerogel-containing layer. Besides, these layers should consist of materials having a low heat conductivity in their own right.

If the other layers contain no aerogel, they may consist of virtually any material if it is capable of combining with the at least one aerogel-containing layer. For this purpose, the methods known to those skilled in the art may be employed. Especially preferred here are the materials also contained as binders in the at least one aerogel-containing layer, as well as foams. As foams, any known foam may be used. Preference is given to foams based on polyurethanes, polyolefines and polystyrenes as disclosed in EP A 0,667,370 or EP A 0,489, 319. Any mixtures of foams may also be present.

Preference is given further to materials employed in vehicle, dwelling house and/or office building construction for interior finishing, as for example carpets, flooring, parquet, wall paper, PVC, plastic, tiles and bricks.

Further, the mechanical strength of the multilayer composite system may be improved by laminating on of screen fabrics, films or hard-fiber panels to the mat surface. The screen fabrics, films or hard-fiber panels may be applied either subsequently or else during production of the composite material. The latter is preferred, and may for example be done in one operation by laying the screen fabrics, films or hard-fiber panels into the mold and onto the aerogel-containing composition to be pressed, and then molded under pressure and temperature to make an aerogel-containing composite panel.

The thickness of the at least one other layer is generally more than 100 microns, preferably at least 500 microns and in particular at least 1 mm. Nevertheless, these layers should be thin, especially compared to the at least one aerogel-containing layer, so that the over-all heat conductivity of the composite material will be as low as possible.

To reduce the radiation component of heat conductivity, the composite material may contain IR turbidity agents, as for example carbon black, titanium dioxide, iron oxides or zirconium dioxide as well as mixtures thereof, as is advantageous especially for high-temperature applications.

Should the composite material, due to the materials or binders used and/or due to hydrophile aerogel particles, become hydrophile, optionally a subsequent treatment may be carried out that imparts hydrophobe properties to the composite material. All substances known to those skilled in the art for this purpose that will lend a hydrophobe surface to the composite material are suitable, as for example lacquers, films, silylation agents, silicone resins, as well as inorganic and/or organic binders.

The multilayer composite materials according to the invention preferably have a density of less than 0.6 g/cm$^3$ and preferably a heat conductivity of less than 100 mW/mK, most especially below 50 mW/mK and particularly in the range from 15 to 40 mW/mK.

The fire rating of the composite material obtained after drying is determined by the fire rating of the aerogel and/or the other constituents. To reach an optimum fire rating of the composite material (not readily flammable, or non-flammable), preferably use is made of materials that are not readily flammable. Examples are urea and melamine formaldehyde resins, silicone resin adhesives, polyimide and polybenzimidazole resins as well as fibers of non-combustible material, as for example mineral, glass or SiC fibers.

Further, to achieve as favorable a fire rating as possible, any materials and methods known to those skilled in the art may be employed, as for example fire-retarding paints, lacquers, films and claddings.

To produce the multilayer composite materials according to the invention, any methods and processes known to those skilled in the art may be employed.

Preferably the at least one aerogel-containing and the at least one other layer are either produced simultaneously and connected to each other in one step, or else produced separately and then connected to each other. This connecting may be done by means of at least one separate binder or by means of the at least one binder used in at least one layer.

In the at least one aerosol-containing layer, the aerogel particles are connected to each other by means of at least one binder. The connection of the individual particles to each other may be made quasi-pointwise. Such a superficial coating may for example be achieved by spraying the aerogel particles with the binder. The coated particles are then for example placed in a mold and allowed to set.

In a preferred embodiment, additionally the interstitial volume between the individual particles is filled out with binder in whole or in part. Such a composition may for example be produced by mixing the aerogel particles and optionally the fibers with the binder.

This mixing may be done in any conceivable manner. Thus it is possible firstly to place the at least two components in the mixing device simultaneously, and secondly one of the components may be taken first and the other(s) then added.

The mixing device required for the mixing is likewise not limited in any way whatever. Any mixing device known to those skilled in the art for this purpose may be used.

The mixing operation is carried out until an approximately uniform distribution of the aerogel particles in the composition is present. This mixing operation may be regulated either through the duration or for example through the speed of the mixing device.

Then follows the molding and setting of the mixture in a mold, by heating and/or evaporating the solvent and/or dispersion agent used, depending on the type of binder, or else, when fusion adhesives are used, by cooling below the melting temperature of the binder.

In a preferred embodiment, the mixture is pressed. Here those skilled in the art can select the suitable press and the suitable tool for the particular application. Owing to the high proportion of air in the aerogel-containing pressing compounds, the use of vacuum presses is advantageous. In a preferred embodiment, the aerogel-containing compounds are pressed into panels. Here the at least one other layer can be pressed directly at the same time.

To prevent the compounds from sticking to the die, the mixture to be pressed may be separated from the die with parting paper. The mechanical strength of the composite materials may be improved by laminating on screen fabrics, mats or papers to the panel surface. The screen fabrics, mats or papers may be either applied to the panels subsequently, in which case the screen fabrics, mats or papers may be previously impregnated with melamine resin for example and then connected to the panel surfaces under pressure in a heatable press, or else, in a preferred embodiment, in one operation, by placing the screen fabrics, mats or papers, which may be previously impregnated with melamine resin, in the mold and placing it on the compound to be pressed, and then pressing it into a composite panel under pressure and temperature.

The pressing, depending on the binder used, is generally done at presses from 1 to 1000 bars and temperatures from 0 to 300° C., in any molds.

The other layers are produced like the aerogel-containing layers if the binder is the same. If these layers are foamed, or contain other materials than the aerogel-containing layers, they may be produced by methods known to those skilled in the art.

For the composite materials according to the invention, containing an especially high volume proportion of aerogel particles and having a correspondingly poor heat conductivity, additional radiation sources can bring heat into the panels. If, as for example in the case of polyvinylbutyrals, the binder used couples with microwaves, that source of radiation is preferred.

The composite materials according to the invention, after setting, are suitable heat-insulating materials, owing to their low heat conductivity.

Besides, the composite materials are suitable acoustic insulators, preferably for damping body and/or tread sounds.

The invention will be described in more detail in the following with reference to embodiments by way of example, without being limited thereby.

The hydrophobe aerogels were prepared analogously to the process disclosed in DE A 4,342,548.

The heat conductivities of the aerogel granulates were measured by a wire filament method (see e.g. O. Nielsson, G. Rüschenpöhler, J. Gross, J. Fricke, *High Temperatures—High Pressures*, vol. 21, 267ç274 (1989)).

The heat conductivities of the shapes were measured according to DIN 53612.

As a measure of the improvement in body and/or tread acoustic insulation, the index of DIN 52210 was determined.

EXAMPLE 1

Aerogel and Polyvinylbutyral Shapes 80 vol. % hydrophobe aerogel granulate and 20 vol. % powdered polyvinylbutyral Mowital® (Polymer F) were intimately mixed. The hydrophobe aerogel granulate has a grain size under 500 microns, a bulk density of 75 kg/m$^3$, a BET surface area of 640 m$^2$/g and a heat conductivity of 11 mW/mK.

The bottom and the cover of the mold, base area 30×30 cm, are lined with parting paper. On the bottom, enough polyvinylbutyral powder Mowital® (Polymer F) is spread so that the subsequent pressing forms a compact layer of polyvinylbutyral 2 mm in thickness. Over this the aerogel-containing compound is spread evenly, and again enough polyvinylbutyral powder Mowital® (Polymer F) spread thereon so that after pressing, a compact layer of polyvinylbutyral 2 mm in thickness is also formed on top. Then it is pressed to a thickness of 18 mm at 220° C. for 30 minutes.

The shape obtained has a density of 380 kg/m$^3$ and a heat conductivity of 33 mW/mK. The tread acoustic improvement measured 18 dB.

EXAMPLE 2

Aerogel and Polyvinylbutyral Shapes 90 vol. % hydrophobe aerogel granulate from Example 1 and 10 vol. % powdered polyvinylbutyral Mowital® (Polymer F) are intimately mixed.

The bottom and the cover of the mold, base area 30×30 cm, is lined with parting paper. As much polyvinylbutyral powder Mowital® (Polymer F) is spread on the bottom so that subsequent pressing forms a compact layer of polyvinylbutyral 2 mm in thickness. On this the aerogel-containing compound is spread evenly, and again enough polyvinylbutyral Mowital® (Polymer F) is spread so that after pressing, a compact layer of polyvinylbutyral 2 mm in thickness forms on top also. Then it is pressed to a thickness of 18 mm at 220° C. for 30 minutes.

The shape obtained has a density of 335 kg/m³ and a heat conductivity of 26 mW/mK. The tread acoustic improvement measures 20 dB.

EXAMPLE 3

Aerogel and Polyvinylbutyral Shapes 95 vol. % hydrophobe aerogel granulate from Example 1 and 5 vol. % powdered polyvinylbutyral Mowital® (Polymer F) are intimately mixed.

The bottom and the cover of the mold, base area 30×30 cm, is lined with parting paper. On the bottom, enough polyvinylbutyral powder Mowital® (Polymer F) is spread so that the subsequent pressing forms a compact layer of polyvinylbutyral 2 mm in thickness. Then the aerogel-containing compound is distributed uniformly, and again enough polyvinylbutyral powder Mowital® (Polymer F) is placed thereon so that after pressing, a compact layer of polyvinylbutyral 2 mm in thickness forms on top also. Then it is pressed to a thickness of 18 mm at 220° C. for 30 minutes.

The shape obtained has a density of 266 kg/m³ and a heat conductivity of 21 mW/mK. The tread acoustic improvement measures 22 dB.

EXAMPLE 4

Aerogel, Polyvinylbutyral and Fiber Shapes 90 vol. % hydrophobe aerogel granulate from Example 1, 8 vol. % powdered polyvinylbutyral Mowital® (Polymer F) and 2 vol. % Trevira® high-strength fibers are intimately mixed.

The bottom and the cover of the mold, base area 30×30 cm, is lined with parting paper. On the bottom is placed enough polyvinylbutyral powder Mowital® (Polymer F) so that subsequent pressing forms a compact layer of polyvinylbutyral 2 mm in thickness. Then the aerogel-containing compound is evenly distributed, and again enough polyvinylbutyral powder Mowital® (Polymer F) is placed thereon so that after pressing, a compact layer of polyvinylbutyral 2 mm in thickness forms on top as well. Then it is pressed to a thickness of 18 mm at 220° C. for 30 minutes.

The shape obtained has a density of 301 kg/m³ and a heat conductivity of 22 mW/mK. The tread acoustic improvement amounts to 24 dB.

The invention claimed is:

1. A multilayer composite material comprising at least three layers, wherein at least one layer is an aerogel-containing layer, which comprises aerogel particles and a binder and wherein the aerogel particles are present in an amount which ranges from 5 to 97 vol. %, and the other two layers do not contain aerogel particles and comprise materials selected from the group consisting of fusion adhesives, plastisols, thermosetting resins, transparent or translucent synthetics, and foams and have a thickness of more than 100 microns, wherein the three layers form a "sandwich" structure in which the aerogel-containing layer is arranged between the two other layers and wherein the binder in the aerogel-containing layer is selected from the group consisting of ethylene vinyl acetate copolymers, polyamides, formaldehyde condensates, polyimides, polybenzimidazoles, cyanacrylates, polyvinyl alcohols, polyvinyl butyrals, polyethylene waxes, anaerobic adhesives, moisture-setting silicones, photo-setting systems, UV-setting systems, methacrylates, two-component silicones, cold-setting epoxy resins, and cold-setting polyurethanes.

2. The multilayer composite material according to claim 1, wherein the aerogel particles in the aerogel-containing layer range in size from 250 microns to 10 mm.

3. The multilayer composite material according to claim 1, wherein the aerogel particles in the aerogel-containing layer comprise silicon compounds.

4. The multilayer composite material according to claim 1, wherein the aerogel particles in the aerogel-containing layer are $SiO_2$ aerogels.

5. The multilayer composite material according to claim 1, wherein the aerogel particles in the aerogel-containing layer comprise permanent hydrophobic surface groups.

6. The multilayer composite material according to claim 1, wherein the aerogel particles in the aerogel-containing layer have porosities over 50% and densities under 0.6 glcm³.

7. The multilayer composite material according to claim 1, wherein the binder in the aerogel-containing layer is present in an amount which ranges from 3 to 95 vol. %.

8. The multilayer composite material according to claim 1, wherein the aerogel-containing layer further comprises a fiber material.

9. The multilayer composite material according to claim 1, wherein the aerogel-containing layer further comprises fillers in an amount of up to 50 vol. %.

10. The multilayer composite material according to claim 1, wherein at least two layers comprise aerogel particles and/or at least one binder.

11. The multilayer composite material according to claim 1, wherein the composite material and/or the aerogel particles in the aerogel-containing layer comprises IR turbidity agents.

12. The multilayer composite material according to claim 1, which has a heat conductivity of less than 100 mW/mR.

13. The multilayer composite material according to claim 1, wherein the binder is selected from the group consisting of polymethylmethacrylates, cycloolefin copolymers, polyvinylbutyrals, polycarbonates, polyethyleneterephthalates, and polyvinyl alcohols.

14. A thermal and/or acoustic insulation material which comprises a multilayer composite material according to claim 1.

15. A method for reducing heat conductivity in a material which comprises adding the multilayer composite material according to claim 1 to said material.

16. A method of reducing the propagation of sound in a material which comprises adding the multilayer composite material according to claim 1 to said material.

17. A multilayer composite material comprising at least three layers, wherein at least one layer is an aerogel-containing layer, which comprises aerogel particles and a binder and wherein the aerogel particles arc present in an amount which ranges from 5 to 97 vol. %, and the other two layers do not contain aerogel particles and comprise materials selected from the group consisting of fusion adhesives, plastisols, thermosetting resins, transparent or translucent synthetics, and foams and have a thickness of at least 500 microns, wherein the three layers form a "sandwich" structure in which the aerogel-containing layer is arranged between the two other layers and wherein the binder in the aerogel-containing layer is selected from the group consisting of ethylene vinyl acetate copolymers, polyamides, formaldehyde condensates, polyimides, polybenzimidazoles, cyanacrylates, polyvinyl alcohols, polyvinyl butyrals, polyethylene waxes, anaerobic adhesives, moisture-setting silicones, photo-setting systems, UV-setting systems, methacrylates, two-component silicones, cold-setting epoxide resins, and cold-setting polyurethanes.

18. The multilayer composite material according to claim 17, wherein the two layers that do not contain aerogel particles have a thickness of at least 1 mm.

* * * * *